United States Patent [19]
Furstenberg

[11] 3,951,623
[45] Apr. 20, 1976

[54] METHOD OF AND APPARATUS FOR CLEANING FILTER BOXES

[75] Inventor: Joachim Furstenberg, Aichelberg, Germany

[73] Assignee: LTG Lufttechnische GmbH, Stuttgart, Germany

[22] Filed: Jan. 10, 1975

[21] Appl. No.: 539,968

Related U.S. Application Data

[63] Continuation of Ser. No. 309,008, Nov. 24, 1972, abandoned.

[30] Foreign Application Priority Data
Nov. 23, 1971 Germany............................ 2148048
Nov. 24, 1971 Germany............................ 2148338

[52] U.S. Cl.................................... 55/96; 55/283; 55/284; 55/484; 55/302
[51] Int. Cl.² ........................................ B01D 46/04
[58] Field of Search ............. 55/283, 284, 96, 302, 55/303, 484

[56] References Cited
FOREIGN PATENTS OR APPLICATIONS
| | | | |
|---|---|---|---|
| 903,890 | 2/1954 | Germany | 55/302 |
| 925,392 | 3/1955 | Germany | 55/302 |
| 643,971 | 10/1950 | United Kingdom | 55/303 |
| 939,641 | 10/1963 | United Kingdom | 55/302 |

*Primary Examiner*—Bernard Nozick
*Attorney, Agent, or Firm*—Edwin E. Greigg

[57] ABSTRACT

In a filter box a first air flow generating unit drives air, containing solid impurities, through a filter disposed upstream of said unit. Without interrupting the drawing of impure air into the filter box, the filter is periodically cleaned by drawing auxiliary air through the clean side of the filter by a second air flow generating unit for dislodging and carrying away impurities accumulated on the work side of the filter. The drawing of impure air into the filter box is effected by the second air flow generating unit during the periodic cleaning operation.

18 Claims, 4 Drawing Figures

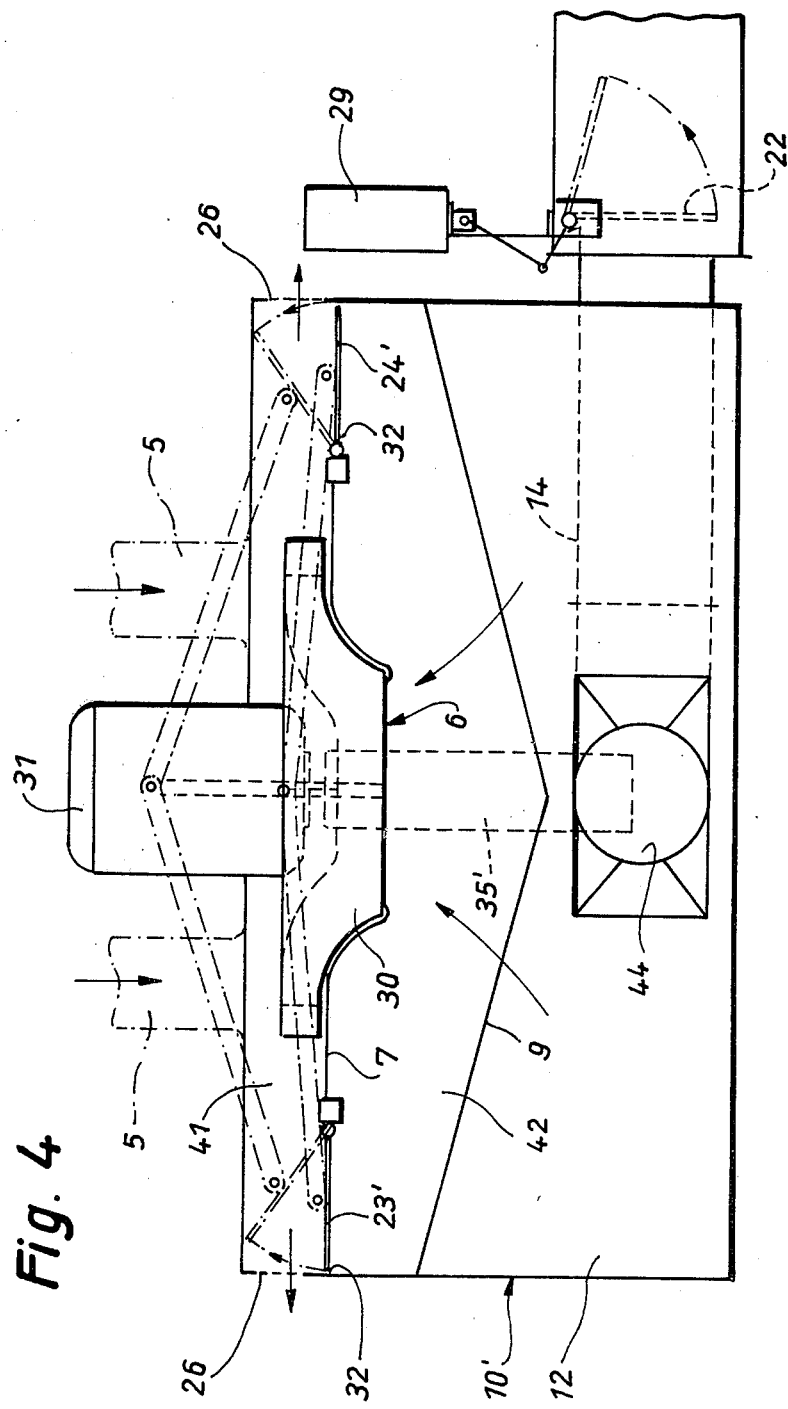

METHOD OF AND APPARATUS FOR CLEANING FILTER BOXES

This is a continuation, of application Ser. No. 309,008, filed Nov. 24, 1972 now abandoned.

BACKGROUND OF THE INVENTION

This invention relates to a method of and apparatus for periodically cleaning stationary filter boxes each containing a first air flow generating unit and a filter disposed upstream thereof. The air to be cleaned which carries solid impurities is drawn through the filter by the first air flow generating unit.

In particular, but in no way exclusively, the invention is concerned with the cleaning of filter boxes used in the textile industry with air suction (vacuum) systems associated with textile machines such as knitting, spinning, or weaving machines, Jacquard looms or the like.

In vacuum systems of the aforenoted type the drawn air contains solid impurities such as fibers, dust specks, yarn fragments or the like, which have to be separated from the air stream. The cleaning of the air is effected in filter boxes in which the air traverses one or more filters. For purposes of substantial economy and automation it is desirable to effect the cleaning and the emptying of the filter boxes automatically. There are known various measures for continuously cleaning a filter of a filter box to avoid the necessity of interrupting the drawing of the impure air during the cleaning of the filter.

These known filter boxes, however, are of expensive structure and have the particular disadvantage that the impurities stopped by the filter are not removed automatically from the filter box; this operation has to be performed manually as before.

There are further known filter boxes in which the filter is not cleaned continuously. Although such filter boxes may have a simple structure, they have the disadvantage that for the cleaning of the filter and for emptying the filter box the air suction (that is, the cleaning of air by the filter) has to be interrupted. For avoiding this disadvantage, there are known filter boxes which have two separate air flow chambers with built-in filters for the air to be cleaned. At any time air is guided only through one of the two flow chambers, while the other, temporarily idle chamber, is submitted to a manual cleaning and emptying operation. Although in filter boxes of this type the suction of the air to be cleaned does not have to be interrupted, the cleaning and emptying of the filter box still has to be performed manually.

OBJECT, SUMMARY AND ADVANTAGES OF THE INVENTION

It is an object of the invention to provide an improved method of and apparatus for cleaning filter boxes wherein the afore-discussed disadvantages are no longer present.

Briefly stated, according to the invention, there is provided a second air flow generating unit which draws air through the filter from that zone of the filter box that adjoins the clean side of the filter. In this manner the air flow generated by said second unit carries the impurities collected at the other side (work side) of the filter. During the cleaning of the filter auxiliary air is introduced into the zone adjoining the clean side of the filter and further, during the cleaning of the filter, the impure air is, as before, admitted into the filter box and drawn away by the second air flow generating unit.

The afore-outlined method may advantageously be practiced in vaccum systems having a plurality of filter boxes, while providing that the second air flow generating unit is used for alternatingly cleaning the filters of a plurality of filter boxes.

The afore-outlined method, according to the invention, has a number of advantages. The cleaning of the filter or filters of the filter box and the removing of the accumulated impurities are effected atuomatically by means of the second air flow generating unit. The drawing of impure air into the filter box is not interrupted during cleaning and emptying, since for such periods the drawing of impure air is taken over by the second air flow generating unit. The latter thus has multiple functions: it cleans the filter, empties the filter box and, during this time, draws the impure air through the filter box.

The invention will be better understood as well as further objects and advantages become more apparent from the ensuing detailed specification of several exemplary embodiments taken in conjunction with the drawing.

BRIEF DESCRIPTION OF THE DRAWING

FIG. 4 is a schematic longitudinal section of a filter box according to a modified embodiment.

DESCRIPTION OF THE EMBODIMENTS

Figure 1:
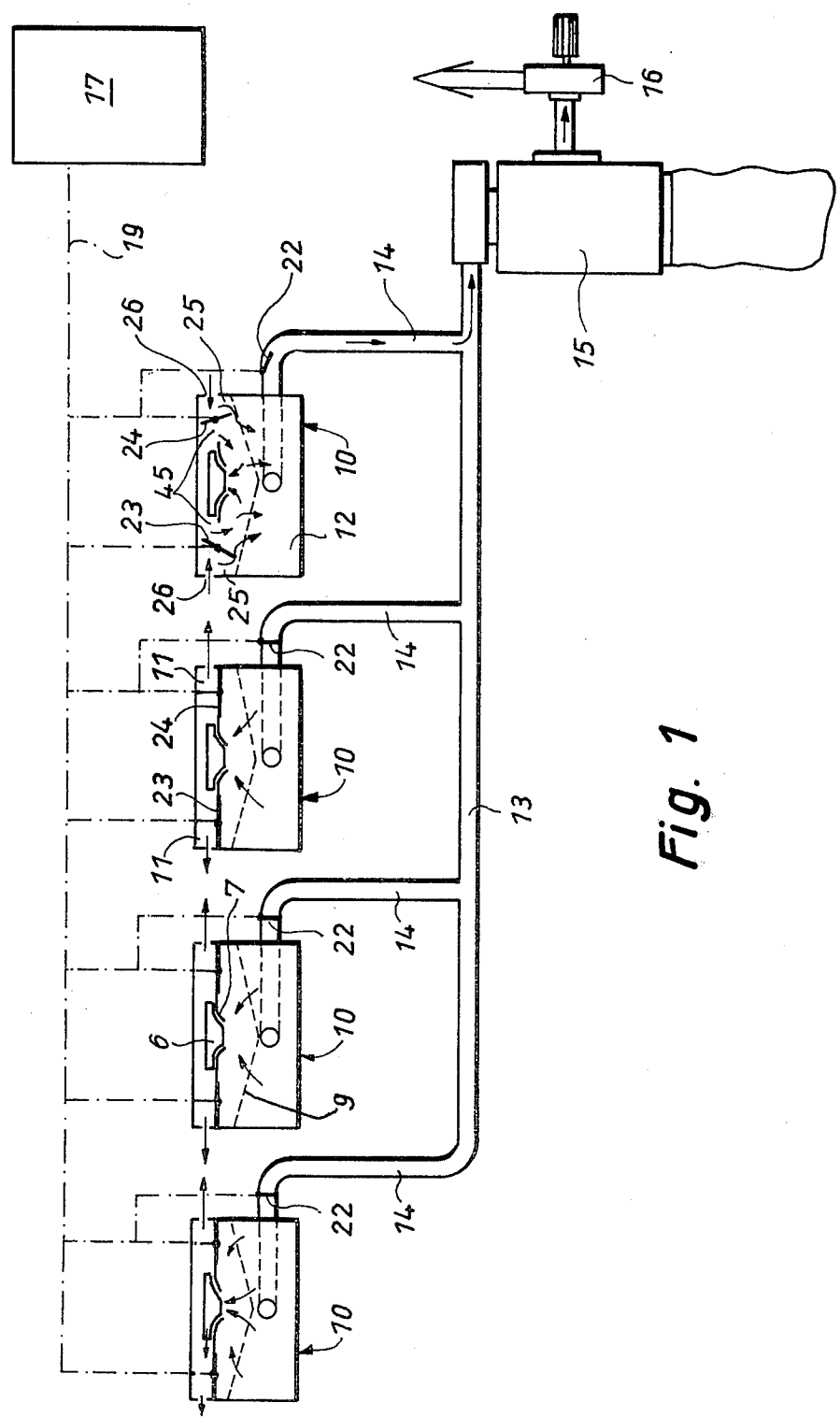
FIG. 1 is a schematic, partial representation of a vacuum system including four filter boxes and incorporating one embodiment of the invention.

Turning now to FIG. 1, there is shown an air suction (vacuum) system which may be associated, for example, with a plurality of knitting machines, (not shown) wherein the air drawn therefrom may serve, for example, for removing the yarn scrap resulting from trimming and for the pneumatic cleaning of the knitting machine. The vaccum system comprises four identical stationary filter boxes 10 shown schematically in section. The suction conduits leading from the knitting machines are not illustrated in FIG. 1; they are designated at 5 in FIGS. 2 and 3.

During the normal operation of the filter boxes, the drawing of air therethrough is effected by means of a first air flow generating unit 6 disposed in each filter box 10 and formed as a radial fan. In each filter box 10 the radial fan 6 is inserted into an opening of a partition 7. At a distance below the suction side of the radial fan 6 there is situated a conical filter 9 which serves for the cleaning of the air drawn therethrough.

The purified (clean) air leaves the individual filter boxes 10 through two diametrically opposed outlets 11 and is blown into the ambient air surrounding the filter boxes. The structure of the individual filter boxes 10 will be described in more detail in connection with FIGS. 2 and 3.

The space 12 of each filter box 10 situated under the work side of the respective filter 9 is connected by means of an associated branch conduit 14 merging into a collector tube 13 and by means of a fiber separator 15 to a central second air flow generating unit 16 which serves for the cleaning of the filter boxes 10 as it will be described later. The second air flow generating unit 16 is also formed as a radial fan. The air drawn thereby is either blown into the surrounding ambient air or may be guided away through an air exit channel. The fiber separator 15 may have any known structure; for example, it may have a continuously rotating filtering drum which is continuously automatically cleaned. The impurities removed from the filtering drum (this removal is preferably effected by suction) are then deposited into a container.

The filter boxes 10 need practically no attendance, since they are alternately and cyclically automatically cleaned and emptied by means of the second air flow generating unit 16.

The fiber separator 15 connected upstream of the second air flow generating unit 16 may be omitted in many cases and instead thereof the still impure air drawn by the second air flow generating unit may be blown into a collector chamber where the impurities may be deposited. The cleaning of such a collecting chamber, (which may be, for example, a room in a cellar), needs to be effected only after very large time intervals. What is essential is that the filter boxes 10 which have a relatively small collecting capacity, be automatically cleaned and emptied, since these operations have to be performed in relatively short time intervals.

The filter boxes 10 are cleaned not simultaneously, but alternatingly. This is effected in the preferred embodiment by means of an automatic cyclically operating switching device 17 sending command signals through control conduits 19 shown in dash-dotted lines. The switching device 17 operates setting motors 29 and 35 (FIG. 2), which may be, for example, air motors formed as piston-and-cylinder units. The setting motors open and close gates 22, 23 and 24.

FIG. 1 depicts the period when the filter box 10 at the extreme right is cleaned. For this purpose the switching device 17 has activated the associated setting motors in such a manner that the gate 22 disposed in the associated branch conduit 14 is opened and the gates 23, 24 arranged in the aforenoted filter box 10 are pivoted into such a position that the air driven by the radial fan 6 is no longer blown our through the outlets 11 as shown for the other three filter boxes 10, but is deflected towards the filter 9 and may be again drawn by the radial fan 6.

In the aforenoted position of the gates 22, 23 and 24, the second air flow generating unit 16 draws auxiliary air from the ambient atmosphere through the openings 26 and the inlet channels 25 formed by the open position of the gates 23 and 24. This occurrence will take place, since in this position of the gate 22 the second air flow generating unit 16 which has a slightly larger output than the first air flow generating unit 6, draws air from the space 12 of the filter box. In this manner, in addition to the auxiliary air, there is drawn air, as before, through the suction conduits 5 (FIG. 2) into the filter box which is temporarily submitted to the cleaning operation. Stated differently, air suction at the knitting machines associated with the right-hand side filter box 10 (FIG. 1) is continuously in progress. Further, air is now drawn through the filter 9 from above downwardly (that is through the clean side of the filter towards the work side thereof); the quantity of the last-named air corresponds to the quantity of the auxiliary air drawn in through the openings 26 of the filter box. In this manner the impurities which are filtered out and which accumulate at the underside (work side) of the filter 9 during normal operation, are blown from the filter downwardly into the chamber 12 and carried through the branch channel 14 and the collecting conduit 13 into the fiber separator 15 for separation. The cleaned air then leaves the second air flow generating unit 16 as used air.

As noted before, during the aforedescribed cleaning (which needs to be only of short duration) performed on the extreme right (FIG. 1) filter box 10, the other three filter boxes of the air suction system operate normally. For this purpose, the gates 22 disposed in the branch conduits 14 associated with the three filter boxes 10 are closed and the gates 23, 24 disposed in these filter boxes are in such a position that the air drawn into these filter boxes through each first air flow generating unit 6 passes through each filter from below upwardly (that is, through the work side of the filter toward the clean side thereof). In this manner the air is cleaned and leaves the normally operating filter boxes through the housing openings 26 (formed then as the terminal apertures of outlets 11) as clean air.

The structure of the filter boxes 10 illustrated only schematically in FIG. 1 will now be described in more detail with reference to FIGS. 2 and 3.

The two suction conduits 5 extending from the knitting machines or the like open into a prechamber 27 provided on one side of the filter box 10. The prechamber 27 communicates with the space 12 that is situated beneath the conical filter 9. In FIG. 2, the two suction conduits 5 are disposed in front of the plane of the drawing and are therefore shown only in dash-dotted lines. Into the chamber 12, at that side of the filter box which is remote from the prechamber 27, there opens, at 44, the branch conduit 14 which leads to the second air flow generating unit 10. In the branch conduit 14 there is disposed the shut-off gate 22 which may be moved by the air motor 29 bettween its open position and its closed position.

In the filter box 10 at a distance above the filter 9 there is disposed the partition 7 which has a central, rotationally symmetrical opening into which there projects the radial impeller 30 of the first air flow generating unit 6 including a drive motor 31. About its central opening the partition 7 is accurately depressed downwardly in such a manner that it follows closely the complemental curved portion of the impeller 30, as shown.

The partition 7 divides the inner space of the filter box 10 into a low pressure side (chambers 42 and 12) and into a high pressure side (pressure chamber 41) as related to the normal operation of the first air flow generating unit 6. The partition 7 has at two opposite sides rectangular openings 32 which extend along the length of the corresponding sides of the partition 7 and which may be closed by the pivotal gates 23 and 24, one associated with each opening 32. Each gate 23, 24 is held by a longitudinally and centrally extending separate shaft 33 that is supported in the filter box housing and projects therefrom in a sealed manner. To one end of each shaft 33 there are secured rectangularly upwardly extending arms 34 to the free ends of which there is connected the air motor 35 by means of jointed rods 36, 37. The rod 36 is connected with the cylinder 40 of the air motor, while the other rod 37 is attached to the piston 39 thereof.

Figure 2:
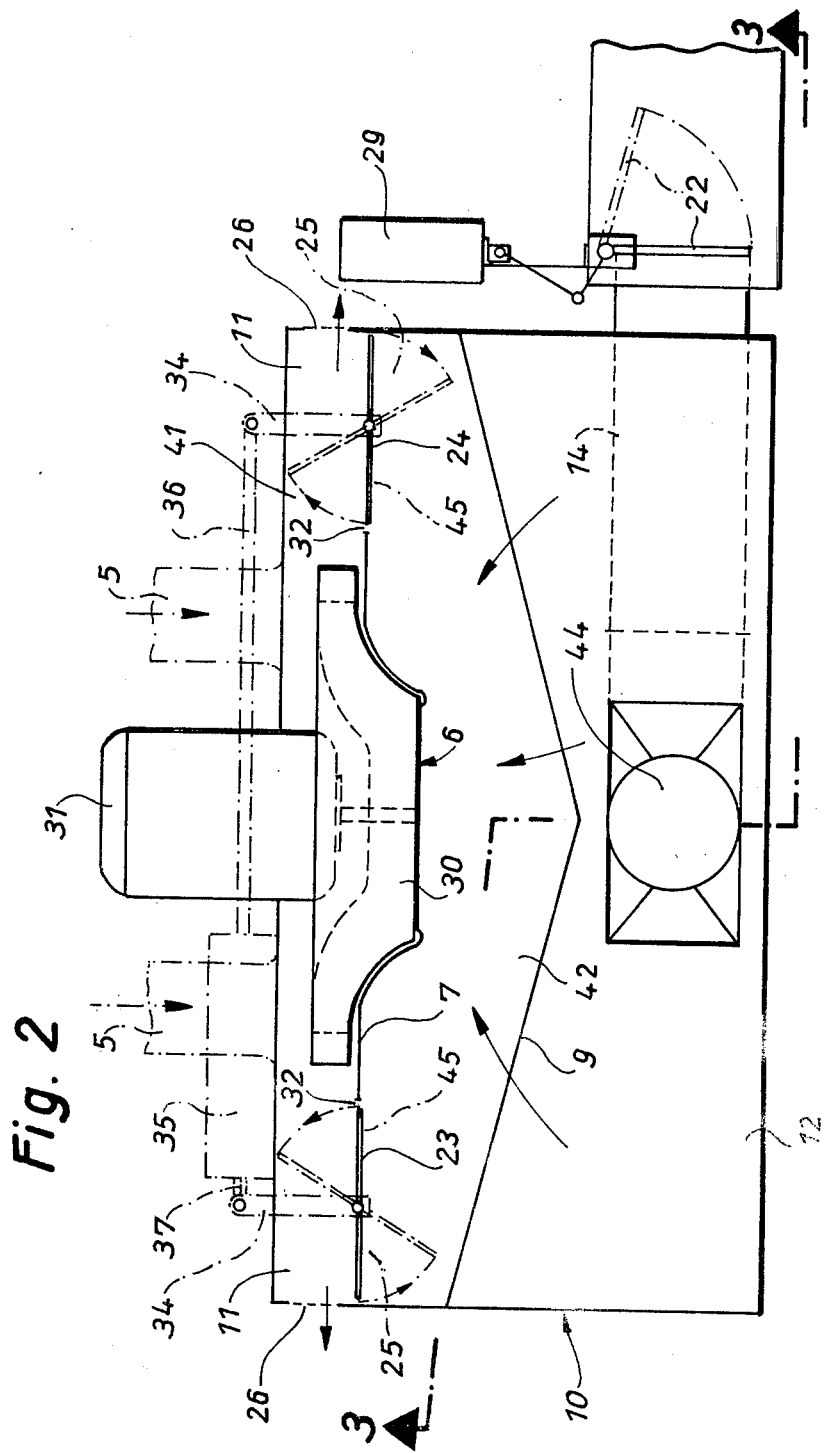
FIG. 2 is a schematic longitudinal sectional view of one of the filter boxes shown in the vacuum system according to FIG. 1.

In the position of the air motor 35 illustrated in FIG. 2, the piston 39 is in a setting in which both gates 23 and 24 close the associated openings 32 of the partition 7, so that the air driven by the radial fan 6 is blown out as clean air through the outlets 11 provided on the sides of the annular pressure chamber 41.

If by means of the switching device 17 the air motor 35 is operated in such a manner that its piston is moved towards the left (as viewed in FIG. 2), then the pivotal gates 23 and 24 will be moved into their setting illustrated in dash-dotted lines in which they tightly engage with one longitudinal gate edge the top wall of the pressure chamber 41. In this manner the air forced into the pressure side by the fan 6 is guided back onto the clean side of the filter 9. Stated differently, the openings provided by the gates 23 and 24 in their dash-dotted position form bypasses 45 for the pressurized air thus providing a downstream short circuit for the radial fan 6.

As illustrated in FIG. 2, by virtue of the dash-dotted position of each gate 23, 24 there are provided on each side of the filter box 10 inlets 25 which, through openings 26, establish communication between the ambient atmosphere and the chamber 42 adjoining the clean side of the filter 9. Thus, the openings 26 now serve as inlet openings for the auxiliary air. In the aforedescribed dash-dotted position of the gates 23, 24, the gate 22 too is in its dash-dotted, open position so that under the effect of the second air flow generating unit 16 auxiliary air is now drawn into the chamber 42 through the openings 26. During this operation, the filter 9 is cleaned since an air quantity that corresponds to the time-wise quantity of the auxiliary air is drawn from above downwardly through the filter 9 by the second air flow generating unit 16. This air flow dislodges the impurities collected at the underside (work side) of the filter 9 during the preceding normal operational phase of the filter box. The dislodged impurities are transported to the fiber separator 15 under the effect of the second air flow generating unit 16 and are there separated from the air stream.

The first air flow generating unit 6 remains operational during the afore-described cleaning of the filter 9 and thus aids the cleaning by means of the air driven thereby through the bypasses 45 onto the clean side of the filter 9. By virtue of drawing auxiliary air in the position of the gates 22, 23, and 24 illustrated in dash-dotted lines, there occurs a continuous flow of air through the filter 9 from above downwardly, thus effecting the cleaning thereof.

The suction opening of the first air flow generating unit 6 is advantageously located at such a distance above the filter 9 that the air drain present, as before, at the suction side of the fan 6 by virtue of the rotation of the impeller 30 does have no appreciable effect on the filter 9 during the cleaning thereof. Here there is taken advantage of the effect that the aforenoted air drain has only a small effective depth of a few centimeters, where as the air blown out through the pressure side by the fan 6 impenges with high velocity on the filter 9 as it is guided through the bypasses 45.

The switching mechanism 7 controlling the position of the gates 22, 23 and 24 is operated in such a manner that each filter box 10 is cleaned in a cyclic manner, whereby the period of cleaning may be of short duration. Thus, if desired, the entire system may comprise a great number of filter boxes which are successively and cyclically cleaned and emptied by means of the sole second air flow generating unit 16. Despite the fact that the second air flow generating unit 16 in this manner cleans and empties a very large number of filter boxes, its output does not have to be large; preferable it can be designed to be only slightly larger than the output of any individual, first air flow generating unit 6 of a filter box 10.

It is to be understood that the invention may find advantageous application even if only a single filter box 10 is associated with the second air flow generating unit 16.

Figure 3:
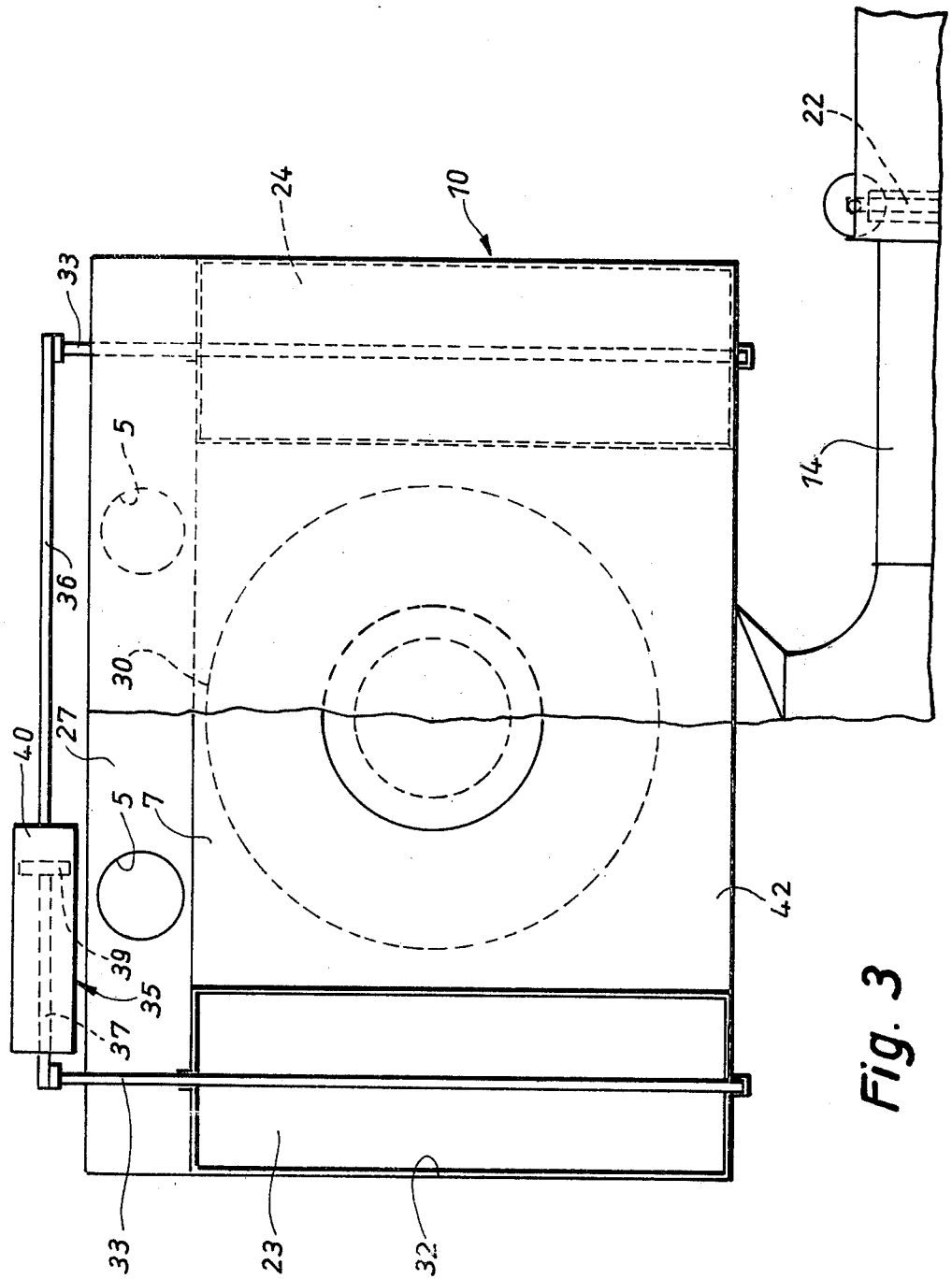
FIG. 3 is a schematic sectional view taken along line 3—3 of FIG. 2.

The filter box 10' illustrated in longitudinal section in FIG. 4 is in substance of the same structure as the filter box 10 shown in FIGS. 2 and 3. The only essential difference resides in the fact that during the cleaning of the filter box 10' for which the gates 23' and 24' are swung upwardly by means of the common air motor 35' from their normal position shown in solid lines into their position shown in dash-dotted lines, the pressure chamber 41 at the pressure side of the first air flow generating unit 6 is completely closed. Thus, the air supplied by the radial fan 6 during the cleaning operation is not blown back to the suction side of the fan 6 and consequently the latter, during the cleaning operation, has practically no suction output. In the dash-dotted position of the gates 23' and 24', auxiliary air is drawn through the openings 26 into the chamber 42 and therefrom through the filter 9 from above downwardly by means of a second air flow generating unit in a manner similar to that described in connection with FIGS. 1, 2 and 3. Thus, the impurities dislodged from the underside (work side) of the filter 9 are drawn away by the second air flow generating unit and this air may be treated by a separator similar to the one described in connection with FIG. 1. The gate 22 disposed in the branch conduit 14 leading to the second air flow generating unit is, during the cleaning operation of the filter box 10', in its open position shown in dash-dotted lines. The second air flow generating unit draws air during this cleaning process also from the suction conduits 5, so that the air suction of the vacuum system at the associated textile machines is not interrupted.

For terminating the cleaning of the filter box 10', the gate 22 is swung into its dash-lined, closed position by means of the air motor 29. In this position, the gate 22 closes the branch channel 14, so that the second air flow generating unit cannot draw any air from the filter box 10'. Simultaneously, by means of the air motor 35, the gates 23' and 24' are pivoted into their full-line positions in which they close the openings 32 provided in the partition 7 and simultaneously establish communication between the openings 26 and the pressure chamber 41, so that the air drawn by the fan 6 from the conduits 5 upwardly through the filter 9 is blown out as filtered air through the openings 26 which now (normal operation) serve as outlet openings for the filtered (clean) air.

It is to be understood that the apparatuses described and illustrated may be modified or redesigned without departing from the scope of the invention.

Thus, for example, the filter box shown in FIG. 2 may be, during the cleaning of its filter, in many cases operated in such a manner that only one of the two pivotal gates 23 and 24, for example, gate 23, is swung into its dash-dotted position, while the other gate 24 remains in its solid line position. In this manner one part of the air drawn during the cleaning of the filter by the first air flow generating unit 6 continues to be blown out through the opening 26 adjacent the gate 24 and the remainder of the air driven by the air fan 6 is blown through the bypass 45 (opened by the gate 23) onto the clean side of the filter 9.

It is known to clean filters by means of counter-currents generated by compressed air and directed in an impact-like manner onto the filter surface. Such a process is described, for example, in German Pat. No. 847,839. If desired, in the apparatus according to the invention, to the air stream that cleans the filter there may be superposed such an air thrust at the beginning or during the cleaning operation by introducing or generating an air thrust for example, in the chamber zone 42 (FIGS. 2, 4). The air thrust may be produced, for example, by shifting with large acceleration the piston of a piston-and-cylinder unit communicating with an opening of the chamber zone 42 or by allowing the inflow of a short air thrust of high compressed air.

That which is claimed is:

1. In a method of removing solid impurities from air and of periodically cleaning at least one, single path, air cleaning filter box which includes a first air flow generating unit and filter disposed upstream thereof, and into which during the normal air cleaning operation, impure air is drawn from a work area and passed through the work side of said filter by said first air flow generating unit, said filter collecting solid impurities on said work side to convert said impure air to clean air being blown out of said filter box by said first air flow generating unit, the improvement comprising the simultaneous steps of
   A. periodically drawing auxiliary air by a second air flow generating unit into said filter box through the clean side of said filter for removing the accumulated impurities from the work side thereof,
   B. drawing said auxiliary air, together with the impurities dislodged from said work side of said filter, out of said filter box by said second air flow generating unit and
   C. drawing said impure air into and out of said filter box by said second air flow generating unit, so that impure air is continuously drawn into said filter box during normal operation and during the cleaning operation without interruption at any time.

2. A method as defined in claim 1, wherein said at least one filter box comprises a plurality of said filter boxes, the improvement comprising the step of sequentially cleaning said filter boxes by said second air flow generating unit.

3. A method as defined in claim 1, wherein said auxiliary air is atmospheric air surrounding said filter box.

4. A method as defined in claim 1, including the step of maintaining said first air flow generating unit energized during the cleaning of said filter box.

5. A method as defined in claim 4, including the step of directing, simultaneously with steps (A), (B) and (C), at least one part of the air drawn through the work side of said filter by said first air flow generating unit, back onto the clean side of said filter.

6. In an apparatus for removing solid impurities from air and for the periodic cleaning of a filter box which includes wall means and has therein (a) a first air flow generating unit, (b) a first space at the suction side of said air flow generating unit, (c) a second space at the pressure side of said first air flow generating unit, (d) a filter disposed in said first space at a distance from said first air flow generating unit, said filter having a clean side oriented downstream with respect to the air stream present during normal operation, and a work side opposite said clean side, (e) impure air inlet means in said wall means in fluid communication with said first space upstream of said filter with respect to the direction of air stream generated by said first air flow generating means, and (f) clean air outlet means in said wall means in fluid communication with said second space for releasing from said filter box the air drawn through said filter by said first air flow generating unit, the improvement comprising:
   A. a second air flow generating unit, having a suction side, for drawing impure air admitted uninterruptedly via said impure air inlet means and for cleaning said filter;
   B. coupling means connecting the suction side of said second air flow generating unit with said first space in said filter box at a location upstream of said filter with respect to the direction of air stream generated by said first air flow generating unit,
   C. control means for providing control output signals from its output,
   D. first shutoff means coupled to said control means and responsive to control signals from its output disposed in the flow path defined by said coupling means and its associated inlet to said first space for maintaining, in response to control signals from said control means, said coupling means open during the cleaning of said filter box and maintaining said coupling means closed during the normal operation of said filter box,
   E. auxiliary air inlet means provided at a location downstream of said filter with respect to the direction of air stream generated by said first air flow generating unit for allowing auxiliary air into said filter box, and
   F. second shutoff means coupled to said control means and responsive to control signals from its output disposed in said filter box for maintaining, in response to control signals from said control means, said auxiliary air inlet means open during the cleaning of said filter box and maintaining said auxiliary air inlet means closed during the normal operation of said filter box,
   whereby said second air flow generating unit draws, during the cleaning operation, auxiliary air through said filter in a direction opposite to that of the air flow generated by said first air flow generating unit during normal operation of said filter box for dislodging and carrying away impurities from the work side of said filter.

7. An apparatus as defined in claim 6, said second air flow generating unit being spaced from said filter box and connected therewith by means of a conduit constituting said coupling means.

8. An apparatus as defined in claim 6, including a separator connected between said filter box and said second air flow generating unit for separating impurities from the air stream drawn from said filter box by said second air flow generating unit.

9. An apparatus as defined in claim 6, said first air flow generating unit including a radial impeller annularly surrounded by said second space.

10. An apparatus as defined in claim 6, including means guiding said auxiliary air onto the clean side of said filter during the cleaning of said filter box.

11. An apparatus as defined in claim 6, wherein the distance between said first air flow generating unit and said filter being of a magnitude that the air drain generated by said first air flow generating unit upstream thereof is of insufficient strength to hinder the cleaning effect of the air stream entering said filter at the clean side thereof during the cleaning of said filter box.

12. An apparatus as defined in claim 6, said first shutoff means fully blocking said pressure side during the cleaning of said filter box.

13. An apparatus as defined in claim 6, wherein said filter has its clean side oriented toward said first air flow generating unit.

14. An apparatus as defined in claim 6, wherein said auxiliary air inlet means is provided within said filter box.

15. An apparatus as defined in claim 6, including third shutoff means for maintaining communication between said clean air outlet means and the pressure side of said first air flow generating unit during normal operation of said filter box and interrupting communication between said clean air outlet means and the pressure side of said first air flow generating unit during the cleaning of said filter box.

16. An apparatus as defined in claim 15, wherein said second shutoff means forms a unitary structure with said third shutoff means.

17. An apparatus as defined in claim 6, including
  A. bypass means connecting the pressure side with the suction side of said first air flow generating means for short circuiting the latter and
  B. means for maintaining said bypass means closed during normal operation of said filter box and maintaining said bypass means open during cleaning of said filter box.

18. An apparatus as defined in claim 17, including means guiding at least part of the air stream generated by said first air flow generating means onto the clean side of said filter when said bypass means is open.

* * * * *